(12) United States Patent
Chang

(10) Patent No.: US 11,019,775 B1
(45) Date of Patent: Jun. 1, 2021

(54) WATER-CIRCULATION IRRIGATION SYSTEM

(71) Applicant: NAFERTINO BIO-TECHNOLOGY CO., LTD., Taichung (TW)

(72) Inventor: Yu-Chen Chang, Taichung (TW)

(73) Assignee: NAFERTINO BIO-TECHNOLOGY CO., LTD., Taichung (TW)

( * ) Notice: Subject to any disclaimer, the term of this patent is extended or adjusted under 35 U.S.C. 154(b) by 0 days.

(21) Appl. No.: 15/931,059

(22) Filed: May 13, 2020

(30) Foreign Application Priority Data

Mar. 16, 2020 (TW) .................................. 109108623

(51) Int. Cl.
*A01G 27/00* (2006.01)
*A01G 9/24* (2006.01)
(Continued)

(52) U.S. Cl.
CPC .......... *A01G 27/005* (2013.01); *A01C 23/042* (2013.01); *A01G 7/045* (2013.01);
(Continued)

(58) Field of Classification Search
CPC ........ A01G 9/022; A01G 9/023; A01G 9/247; A01G 9/249; A01G 27/003; A01G 27/005;
(Continued)

(56) References Cited

U.S. PATENT DOCUMENTS

| | | | | |
|---|---|---|---|---|
| 4,161,844 A | * | 7/1979 | Hentschel | A01G 31/02 47/62 R |
| 5,251,399 A | * | 10/1993 | Rasmussen | A01G 9/023 211/88.03 |

(Continued)

FOREIGN PATENT DOCUMENTS

| | | | | |
|---|---|---|---|---|
| CA | 2911494 A1 | * | 1/2016 | A01G 31/06 |
| CH | 697385 B1 | * | 9/2008 | A01G 22/15 |

(Continued)

OTHER PUBLICATIONS

Notice of Allowance issued in corresponding Taiwan Application No. 109108623, dated Oct. 20, 2020, with an English translation.
(Continued)

*Primary Examiner* — Lisa L Tsang
(74) *Attorney, Agent, or Firm* — Birch, Stewart, Kolasch & Birch LLP

(57) ABSTRACT

A water-circulation irrigation system includes a water supply device and a planting device. The planting device includes a water storage container, an irrigation pipeline, a nozzle and a recycling pipeline. One end of the irrigation pipeline is in communication with the water storage container and has a water supply end. The planting device includes a water collection container, a planting tray and a shunting element. The water collection container has a water dispensing post. The planting tray is disposed at an opening of the water collection container. The planting tray has a fitting portion and a through hole and corresponds in position to a water collection space of the water collection container. The shunting element includes a fertilizer chamber and is disposed at the rim of the through hole of the fitting portion. Therefore, a fertilizer solution is produced in a manpower-efficient manner and thus conveniently.

8 Claims, 12 Drawing Sheets

(51) Int. Cl.
*A01G 7/04* (2006.01)
*A01G 9/02* (2018.01)
*A01C 23/04* (2006.01)
*A01G 29/00* (2006.01)

(52) U.S. Cl.
CPC .............. *A01G 9/022* (2013.01); *A01G 9/023* (2013.01); *A01G 9/028* (2013.01); *A01G 9/247* (2013.01); *A01G 9/249* (2019.05); *A01G 27/001* (2013.01); *A01G 27/003* (2013.01); *A01G 27/006* (2013.01); *A01G 29/00* (2013.01)

(58) Field of Classification Search
CPC ........ A01G 31/02; A01G 31/06; A01G 29/00; A01C 23/042
USPC ........ 47/59 R, 60, 62 R, 62 A, 62 N, 63, 79, 47/82, 83
See application file for complete search history.

(56) References Cited

U.S. PATENT DOCUMENTS

| | | | |
|---|---|---|---|
| 8,959,834 B2* | 2/2015 | Hashimoto | A01G 9/025 47/63 |
| 2007/0011944 A1* | 1/2007 | Triantos | A01G 31/02 47/62 R |
| 2010/0212225 A1* | 8/2010 | Felknor | A01G 27/005 47/79 |
| 2012/0085026 A1* | 4/2012 | Morris | A01G 31/06 47/62 A |
| 2012/0279127 A1* | 11/2012 | Yusibov | A01G 31/06 47/62 N |
| 2014/0000162 A1* | 1/2014 | Blank | A01G 31/06 47/62 A |
| 2014/0017043 A1* | 1/2014 | Hirai | A01G 31/06 414/267 |
| 2014/0090295 A1* | 4/2014 | Fambro | A01G 9/1423 47/62 N |
| 2015/0068121 A1* | 3/2015 | Probst | A01G 31/06 47/59 R |
| 2016/0212954 A1* | 7/2016 | Argento | A01G 31/02 |
| 2016/0345518 A1* | 12/2016 | Collier | A01G 9/023 |
| 2017/0318762 A1 | 11/2017 | Kuo | |
| 2018/0092337 A1* | 4/2018 | Hori | A01G 31/06 |
| 2019/0021249 A1* | 1/2019 | Ivanescu | A01G 9/047 |
| 2019/0297803 A1* | 10/2019 | Gomez | A01G 27/005 |
| 2020/0022323 A1* | 1/2020 | Mendes | A01G 27/005 |

FOREIGN PATENT DOCUMENTS

| | | | | |
|---|---|---|---|---|
| CN | 110249849 A | | 9/2019 | |
| DE | 631208 C | * | 12/1936 | ............ A01G 31/06 |
| JP | S-6430524 A | * | 2/1989 | |
| JP | 6013724 B2 | * | 10/2016 | |
| TW | M516303 U | | 2/2016 | |

OTHER PUBLICATIONS

Office Action issued in corresponding Taiwan Application No. 109108623, dated Sep. 7, 2020, with an English translation.

* cited by examiner

US 11,019,775 B1

WATER-CIRCULATION IRRIGATION SYSTEM

BACKGROUND OF THE INVENTION

1. Technical Field

The present disclosure relates to fertilization and irrigation apparatuses with a view to planting crops and vegetables and, more particularly, to a water-circulation irrigation system with a view to planting crops and vegetables.

2. Description of the Related Art

Conventional ways to carry out fertilization and irrigation with a view to planting crops and vegetables mostly require mixing fertilizer and water by hand to form a fertilizer solution, pouring the fertilizer solution into a storage chamber, drawing the fertilizer solution from the storage chamber with an irrigation apparatus, and delivering the drawn fertilizer solution to a planting site so as to carry out fertilization and irrigation to the crops and/or vegetables thus planted at the planting site.

The foregoing conventional ways to carry out fertilization and irrigation have disadvantages described below. The prior art requires farmers to prepare the fertilizer solution and store the fertilizer solution in the storage chamber. Impurities in the fertilizer solution have a negative effect on the performance of the irrigation apparatuses. If the surplus fertilizer solution is recycled upon completion of fertilization and irrigation and reused in preparation of the fresh fertilizer solution, the fertilizer solution thus freshly prepared will be more likely to contain impurities and thereby affect the service life of the irrigation apparatuses.

BRIEF SUMMARY OF THE INVENTION

In view of the aforesaid drawbacks of the prior art, it is an objective of the present disclosure to provide a water-circulation irrigation system capable of producing a fertilizer solution in a labor-efficient manner and thus conveniently.

In order to achieve the above and other objectives, the present disclosure provides a water-circulation irrigation system comprising a water supply device and one planting device.

The water supply device comprises a water storage container, an irrigation pipeline, a nozzle and a recycling pipeline. One end of the irrigation pipeline is in communication with the water storage container. The other end of the irrigation pipeline has a water supply end. One end of the recycling pipeline is in communication with the water storage container.

The planting device comprises a water collection container, a planting tray and a shunting element. The water collection container has a bottom portion, an external portion, a sidewall and a water dispensing post. The sidewall surrounds the bottom portion in such a manner to form a water collection space and an opening in communication with the outside. The water dispensing post is disposed in the water collection space to penetrate the bottom portion and the external portion and then extend away from the bottom portion and the external portion. The water dispensing post has therein a water dispensing hole exposed from top and bottom surfaces of the water dispensing post. The planting tray is disposed at an opening of the water collection container. The planting tray has a fitting portion. The fitting portion has therein a through hole and corresponds in position to the water collection space of the water collection container. The shunting element comprises a fertilizer chamber and is disposed at the rim of the through hole of the fitting portion of the planting tray.

Preferably, the nozzle of the water supply device is disposed between a water supply end of the irrigation pipeline and the fitting portion of the planting tray of the planting device.

Preferably, the water dispensing hole of the water collection container of the planting device is in communication with another end of the recycling pipeline of the water supply device and in communication with the water storage container.

Fine structures, features, assembly or operation of the water-circulation irrigation system of the present disclosure are illustrated by embodiments and described below. However, persons skilled in the art understand that the description below and the specific embodiments are illustrative of the present disclosure rather than restrictive of the claims of the present disclosure.

DETAILED DESCRIPTION OF THE INVENTION

Figure 1:
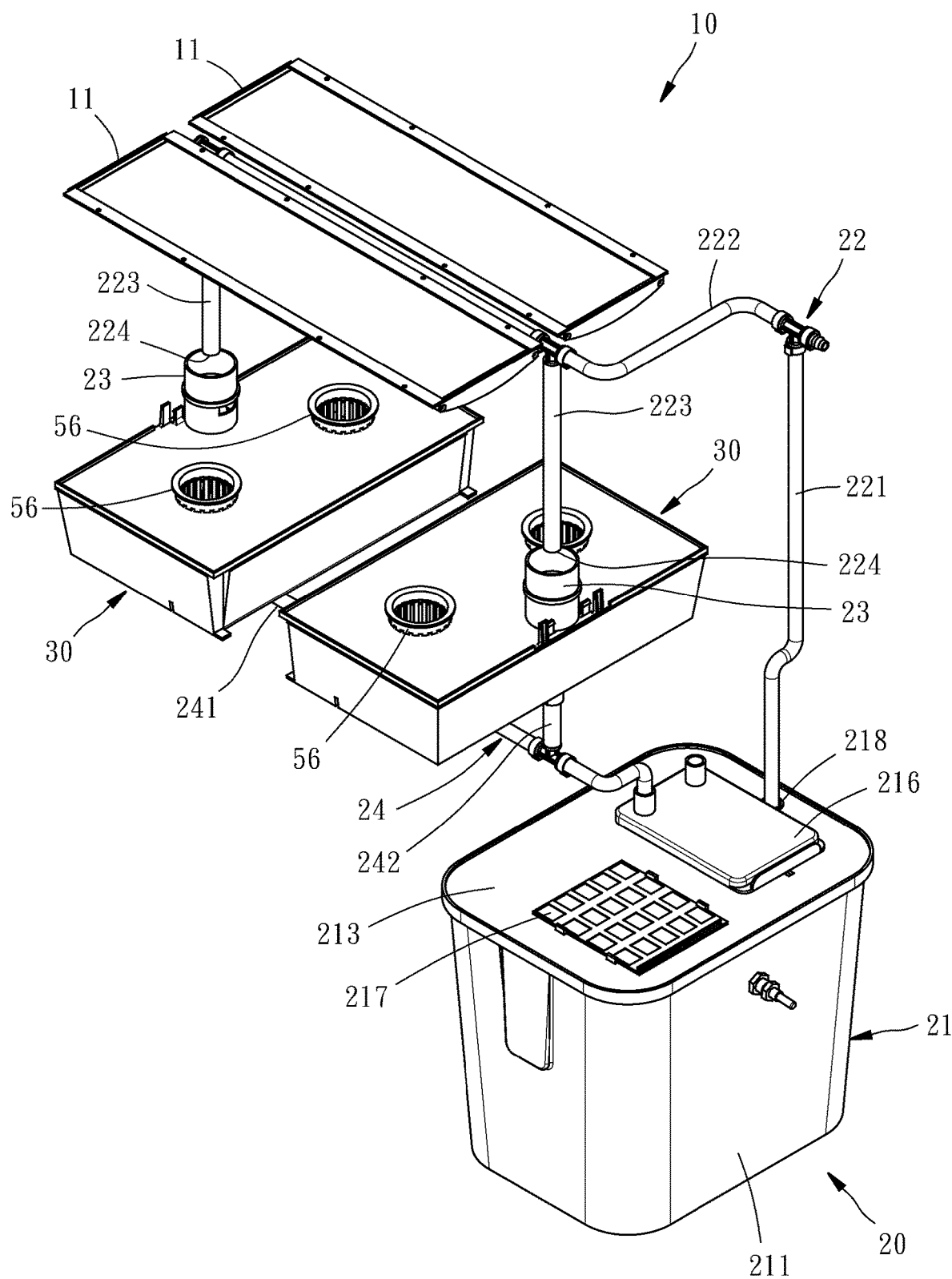
FIG. 1 is a perspective view of a water-circulation irrigation system and two planting devices according to the first preferred embodiment of the present disclosure.

Identical reference numerals used in the embodiments and accompanying drawings of the present disclosure denote identical or similar components or structural feature.

Figure 3:
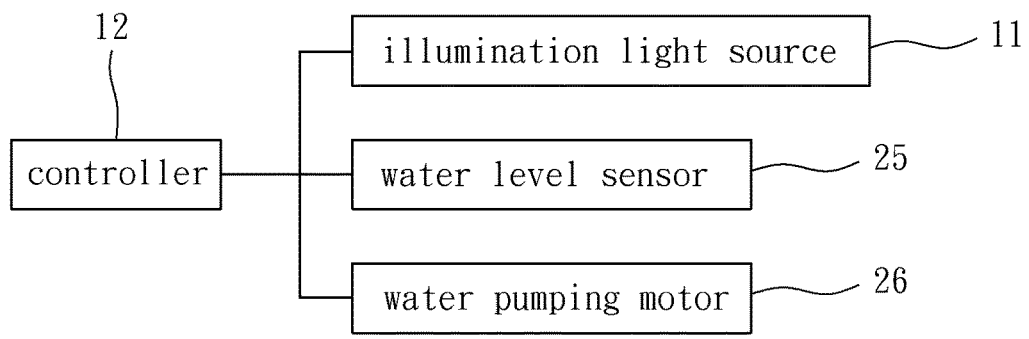
FIG. 3 is a block diagram of some of the elements of the water-circulation irrigation system shown in FIG. 1.

Referring to FIG. 1 and FIG. 3, in the first preferred embodiment of the present disclosure, a water-circulation irrigation system 10 comprises one controller 12, one water supply device 20 and two planting devices 30. The planting devices 30 are in the number of at least one or in a plural number as needed. In practice, the water supply device 20 and the two planting devices 30 are mounted on one skeleton. The skeleton is equipped with two illumination light sources 11 (for example, LED lamps) for emitting light and thus illuminating the two planting devices 30, respectively.

Figure 2:
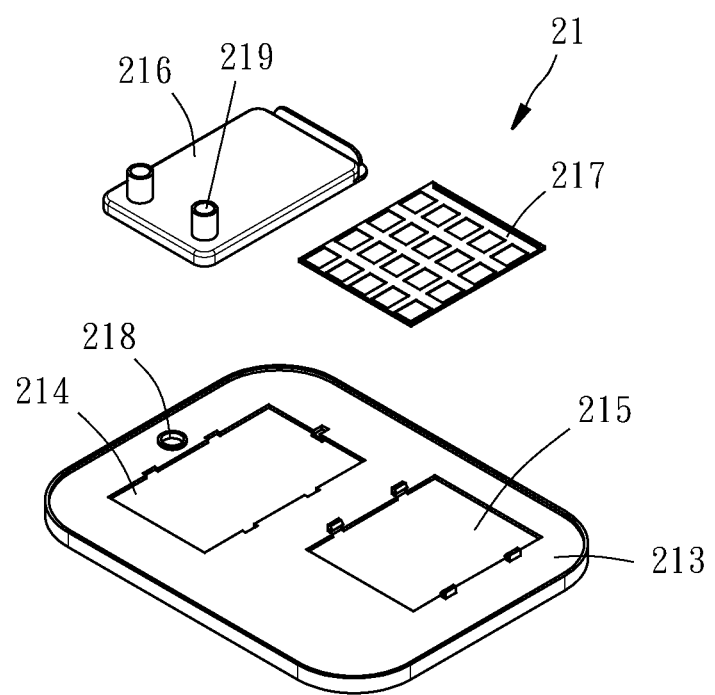
FIG. 2 is an exploded view of a water supply device shown in FIG. 1.
Figure 2:
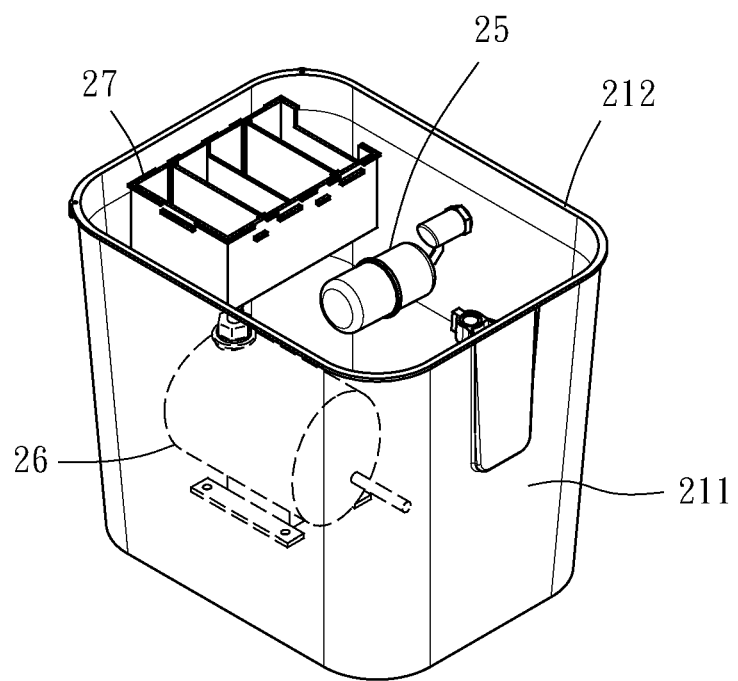

Referring to FIG. 2, the water supply device 20 comprises one water storage container 21, one irrigation pipeline 22, two nozzles 23, one recycling pipeline 24, one water level sensor 25 (for example, buoy), one water pumping motor 26, and one filtration box 27 having therein a water-filtering component or material.

The nozzles 23 correspond in number to the planting devices 30 and thus are in the number of one or in a plural number. The water storage container 21 comprises a water storage bucket 211, a top panel 213 for covering an upper opening 212 of the water storage bucket 211, and two cover panels 216, 217 for covering two rectangular holes 214, 215 of the top panel 213, respectively. The water level sensor 25 is disposed in the water storage bucket 211 and adapted to sense the water level thereof. The water pumping motor 26 is disposed in the water storage bucket 211 and adapted to draw water from the water storage bucket 211.

Referring to FIG. 1, the irrigation pipeline 22 comprises a vertical segment 221, a horizontal segment 222, and two water supply segments 223. The lower end of the vertical segment 221 is penetratingly disposed at a round hole 218 of the top panel 213 of the water storage container 21 and then is in communication with the water storage bucket 211. The lower end of the vertical segment 221 is connected to the water pumping motor 26. The upper end of the vertical segment 221 is connected to and in communication with the horizontal segment 222. One end of each water supply segment 223 is connected to and in communication with the horizontal segment 222, such that the other end of the water supply segment 223 forms a water supply end 224. The recycling pipeline 24 comprises a horizontal segment 241 and two water collection segments 242 connected to and in communication with the horizontal segment 241. One end of the horizontal segment 241 penetrates a penetrating hole 219 of the cover panel 216 of the water storage container 21 and then is in communication with the filtration box 27 disposed in the water storage container 21 and positioned under the cover panel 216. The water supply ends 224 and the water supply segments 223 of the irrigation pipeline 22 and the water collection segments 242 of the recycling pipeline 24 correspond in number to the planting devices 30 and thus are in the number of one or in a plural number.

Referring to FIG. 3, the controller 12 is electrically connected to the illumination light sources 11, the water level sensor 25, and the water pumping motor 26. The controller 12 electrically controls the turning on and turning off of the illumination light sources 11.

Figure 4:
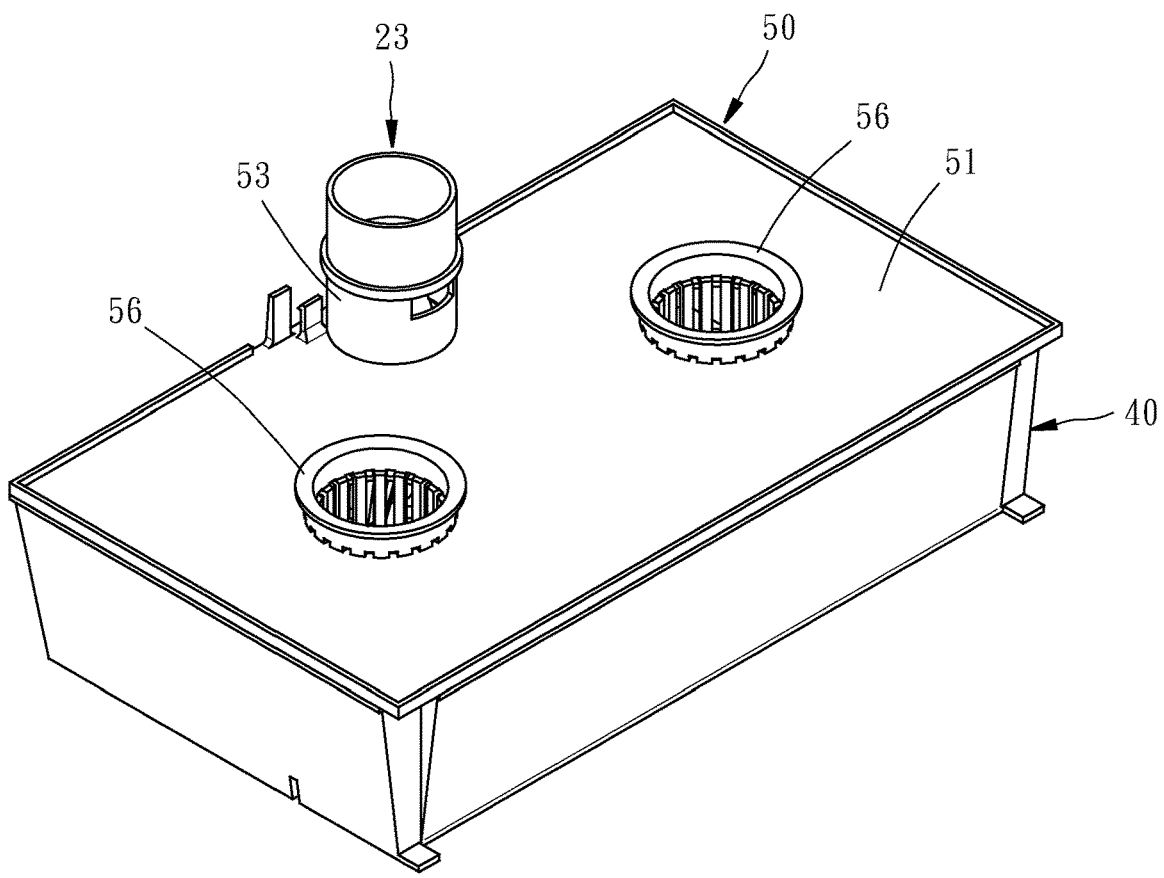
FIG. 4 is a perspective view based on FIG. 1, showing one planting device operating in conjunction with one nozzle and two planting cans.
Figure 5:
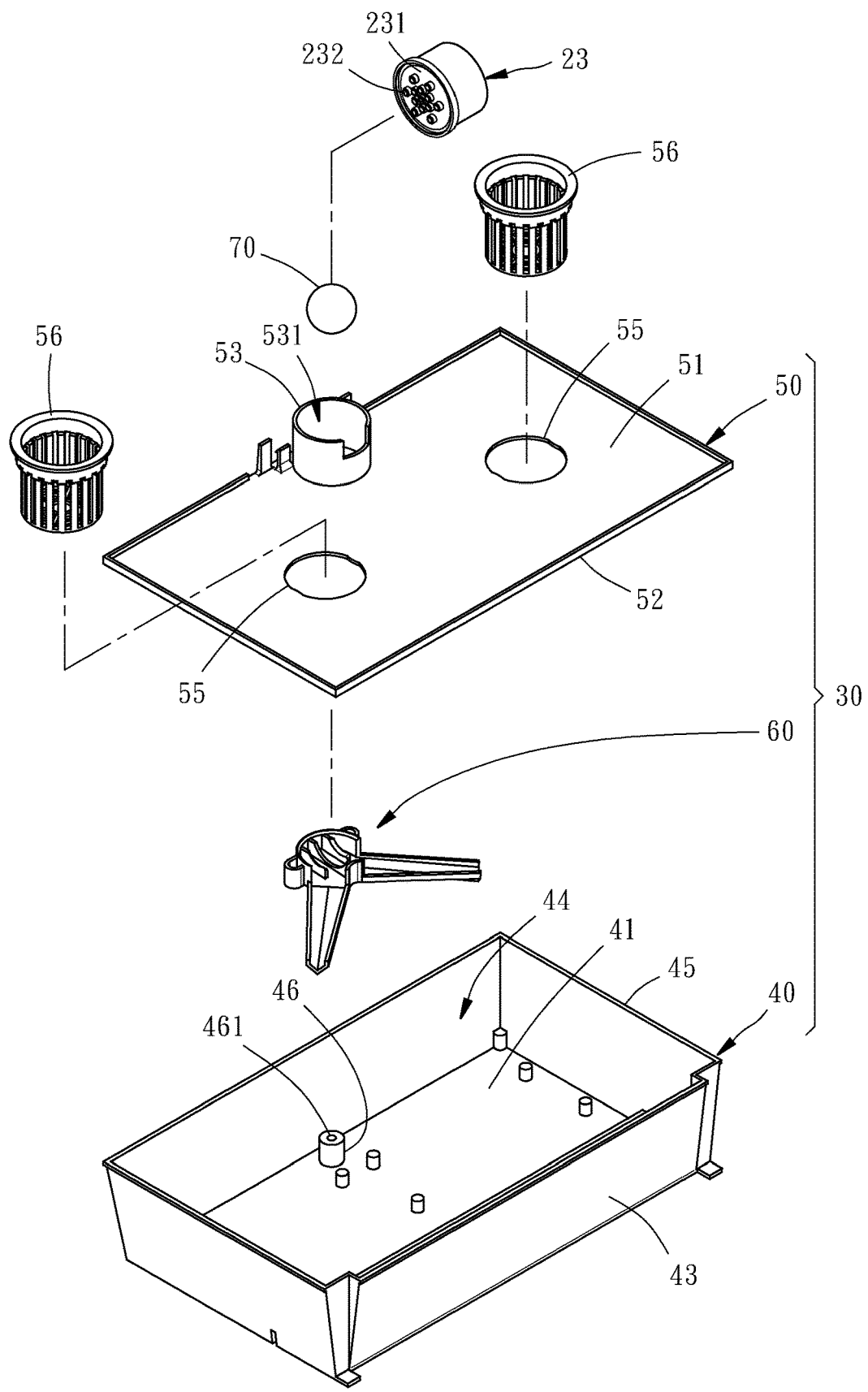
FIG. 5 is an exploded view based on FIG. 4.
Figure 6:
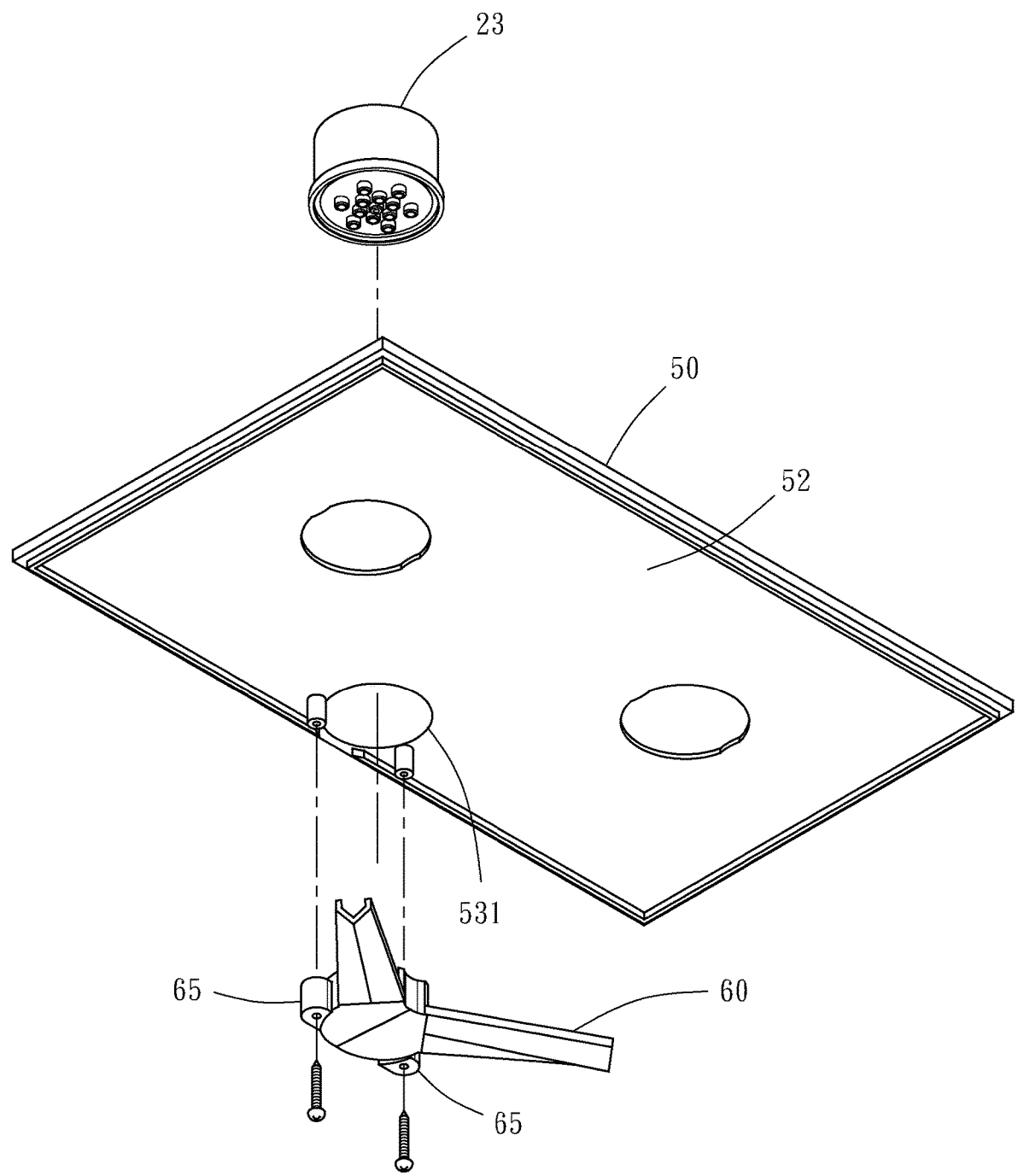
FIG. 6 is an exploded view based on FIG. 4 but taken from an angle different from that of FIG. 5.
Figure 7:
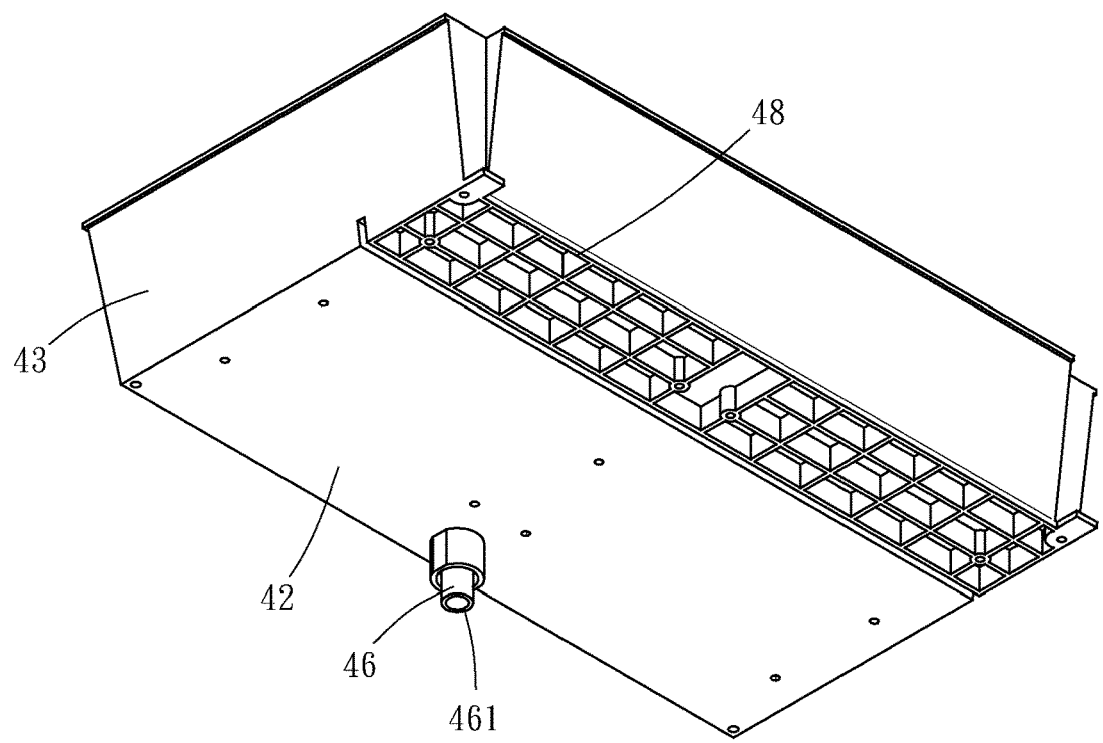
FIG. 7 is a perspective view of the planting device shown in FIG. 4 but taken from an angle different from that of FIG. 4.
Figure 8:
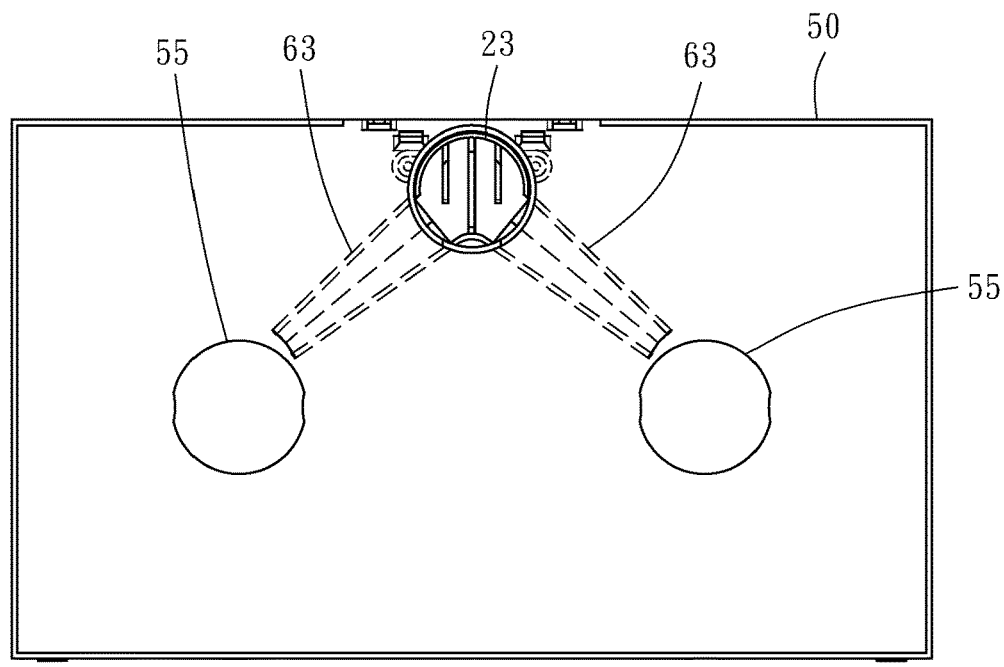
FIG. 8 is a top view of a planting tray shown in FIG. 5.
Figure 9:
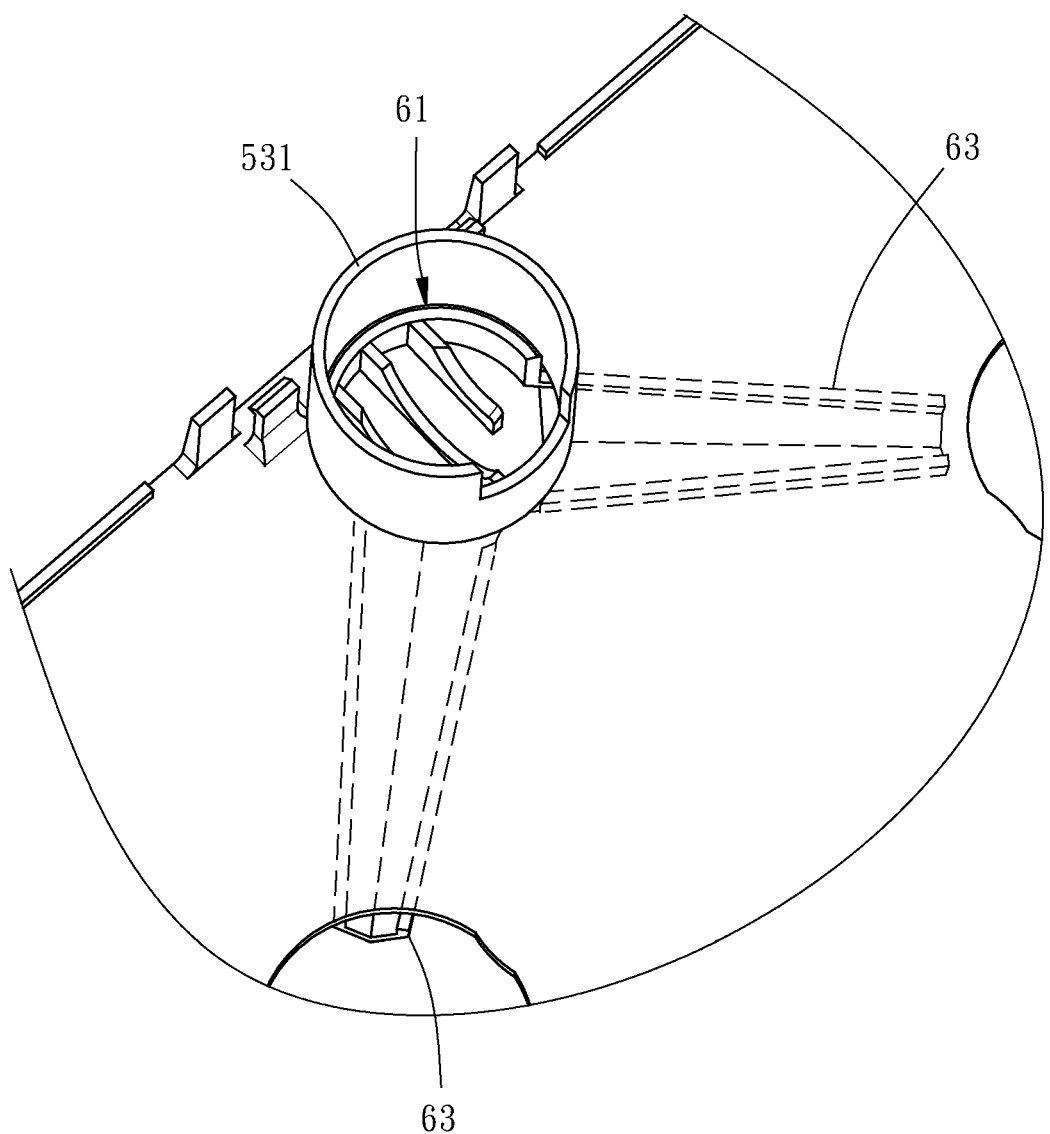
FIG. 9 is a partial enlarged schematic view based on FIG. 8.
Figure 10:
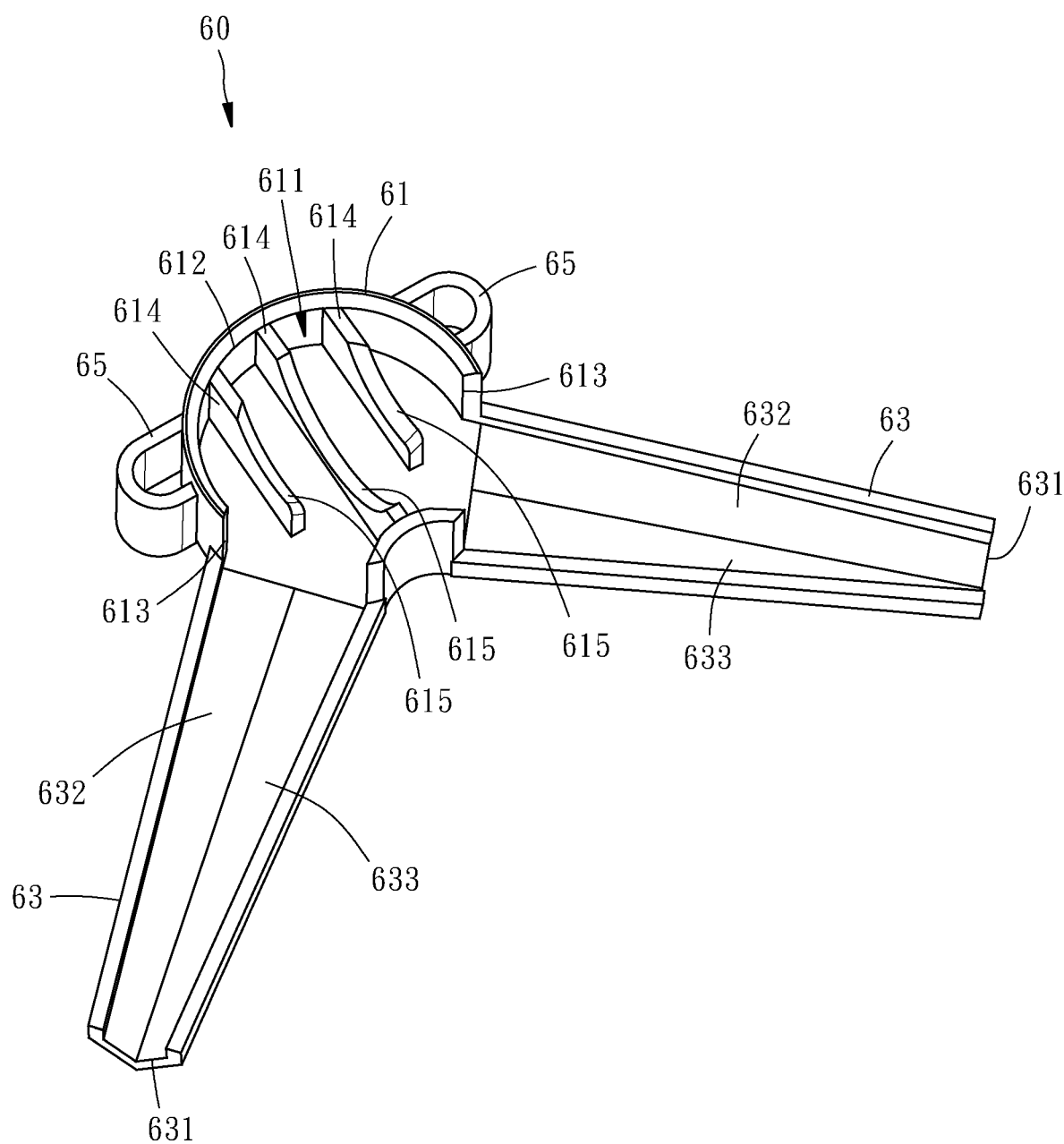
FIG. 10 is a perspective view of a shunting element shown in FIG. 5.

Referring to FIG. 1, FIG. 4 and FIG. 5, the nozzles 23 are substantially cup-shaped and adapted to hold water dispensed from the water supply end 224 of the irrigation pipeline 22. A plurality of pores 232 are formed on a bottom surface 231 of each nozzle 23; consequently, the water held in the nozzles 23 is slowly sprayed to the planting devices 30 via the pores 232. In this embodiment, the nozzles 23 are removably connected to the planting devices 30 and correspond in position to the water supply end 224 of the irrigation pipeline 22 from below. In a variant embodiment of the present disclosure, the nozzles 23 are connected to the water supply end 224 of the irrigation pipeline 22 from below.

Referring to FIG. 1, FIG. 4 through FIG. 7, the planting devices 30 each comprise one water collection container 40, one planting tray 50 and one shunting element 60.

The water collection container 40 has one bottom portion 41, one external portion 42 opposing the bottom portion 41, and one sidewall 43. The sidewall 43 surrounds the bottom portion 41 in such a manner to form a water collection space 44 and an opening 45 in communication with the outside. The water collection container 40 has therein one water dispensing post 46 which penetrates the bottom portion 41 and the external portion 42. The two ends of the water dispensing post 46 extend away from the bottom portion 41 and the external portion 42, respectively. The water dispensing post 46 has therein one water dispensing hole 461 exposed from the top and bottom surfaces of the water dispensing post 46. The water dispensing hole 461 of the water dispensing post 46 of the water collection container 40 is not only in communication with the water collection segments 242 of the recycling pipeline 24 of the water supply device 20 but also in communication with the filtration box 27 in the water storage container 21 via the horizontal segment 241 of the recycling pipeline 24. The external portion 42 of the water collection container 40 has a plurality of latticed engaging portions 48. A user mounts the planting devices 30 on the latticed engaging portions 48 of the water collection container 40 by means of engagement or insertion, respectively.

The planting tray 50 corresponds in size and dimensions to an opening 45 of the water collection container 40 and is removably fitted to the opening 45 of the water collection container 40. The planting tray 50 has one top surface 51, one bottom surface 52 opposing the top surface 51, and one fitting portion 53. The fitting portions 53 of the planting trays 50 of the planting devices 30 correspond in position to the nozzles 23 of the water supply device 20 and are removably fitted to the nozzles 23, respectively. In this embodiment, the fitting portion 53 extends upward from the top surface 51, and the free end of the fitting portion 53 forms one through hole 531 which extends toward the bottom surface 52. The planting tray 50 has two planting holes 55. The two planting holes 55 penetrate the planting tray 50 and are exposed from the top surface 51 and the bottom surface 52. Two planting cans 56 which hold crops and/or vegetables are placed in the two planting holes 55, respectively.

Figure 11:
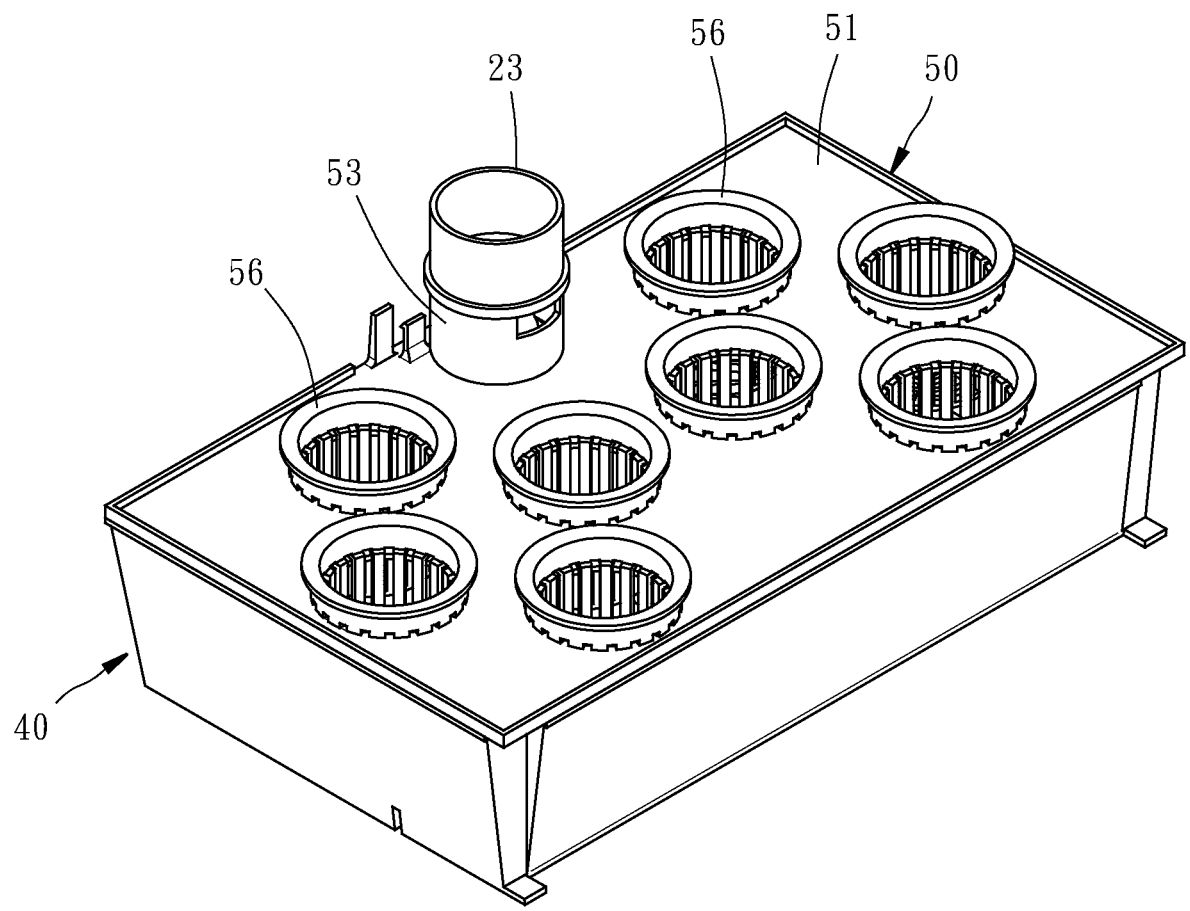
FIG. 11 is a perspective view similar to FIG. 4 except that the planting device in FIG. 11 has a different structure and operates in conjunction with one nozzle and eight planting cans.

Referring to FIG. 4 and FIG. 11, the planting trays 50 of the planting devices 30 are removably fitted to the openings 45 of the water collection containers 40, whereas the planting holes 55 of the planting trays 50 are in the number of at least one or in a plural number. Therefore, the user may choose or change the planting trays 50 of the planting devices 30 in terms of shapes and forms, as needed, so as to increase the flexibility of application of the present disclosure.

Referring to FIG. 5 through FIG. 10, the shunting element 60 comprises one fertilizer chamber 61, two shunting channels 63 in communication with the fertilizer chamber 61, and two fastening portions 65. The fertilizer chamber 61 of the shunting element 60 corresponds in position to the through hole 531 of the fitting portion 53 of the planting tray 50. One end of each shunting channel 63 and the corresponding fastening portion 65 are spaced apart and surround the outer sidewall of the fertilizer chamber 61. The fertilizer chamber 61 has one receiving space 611 for receiving a fertilizer lump 70 (for example, a slowly-dissolving fertilizer lump), one upper opening 612 in communication with the receiving space 611, two lateral openings 613 in communication with the receiving space 611, and three support ribs 614 disposed in the receiving space 611 and spaced apart. The support ribs 614 each have a concave arcuate surface 615 facing the upper opening 612. One end of each shunting channel 63 is in communication with the lateral opening 613, such that the other end of the shunting channel 63 has one outlet end 631. In general, each shunting channel 63 is formed by connecting a first guide panel 632 and a second guide panel 633 and tapers toward the outlet end 631. Preferably, the first guide panel 632 and second guide panel 633 each have a substantially V-shaped cross section.

The support ribs 614 in the fertilizer chamber 61 of the shunting element 60 are in the number of at least one or in a plural number, whereas the shunting channels 63 of the shunting element 60 are also in the number of at least one or in a plural number, and these numbers are subject to changes according to the quantity of crops and/or vegetables being planted. The shunting element 60 is fastened to the rim of the through hole 531 of the bottom portion 52 of the planting tray 50 by two screws penetratingly disposed at the two fastening portions 65, respectively.

Referring to FIG. 1 through FIG. 10, the technical features of the water-circulation irrigation system 10, its constituent elements and technical means of connection thereof, its usage, and its operation process are described below.

First, the fertilizer lumps 70 are placed on the support ribs 614 of the fertilizer chambers 61 of the shunting elements 60 of the planting devices 30 via the through holes 531 of the fitting portions 53 of the planting trays 50 of the planting devices 30. Preferably, the fertilizer lumps 70 are precisely confined to the concave arcuate surfaces 615 of the support ribs 614. After that, the nozzles 23 of the water supply device 20 are connected to the fitting portions 53 of the planting trays 50 of the planting devices 30, respectively, such that the pores 232 on the bottom surfaces 231 of the nozzles 23 correspond in position to the through holes 531 of the fitting portions 53 of the planting trays 50 and face the fertilizer lumps 70 placed on the fertilizer chambers 61 of the shunting elements 60. The two planting cans 56 holding crops and/or vegetables are placed in the two planting holes 55, respectively.

Then, the water supply device 20 is electrically started, such that at predetermined points in time the water pumping motor 26 transfers water from the water storage bucket 211 of the water storage container 21 to the irrigation pipeline 22, thereby supplying water to the nozzles 23 via the water supply ends 224. Consequently, the water is sprayed to the fertilizer lumps 70 on the fertilizer chambers 61 of the shunting elements 60 to allow the fertilizer lumps 70 to be slowly rinsed and dissolved, so as to form a fertilizer solution of a low concentration. Hence, the fertilizer solution flows into the water collection spaces 44 of the water collection containers 40 via the outlet ends 631 of the shunting channels 63 of the shunting elements 60. Therefore, not only is the low-concentration fertilizer solution accumulated, but fertilization and irrigation is also carried out to the bottoms or roots of crops and/or vegetables of the planting cans 56 received in the water collection spaces 40.

Therefore, as soon as the level of the low-concentration fertilizer solution in the water collection spaces 44 of the water collection containers 40 rises above the water dispensing holes 461 in the water collection spaces 44 of the water collection containers 40, the surplus low-concentration fertilizer solution overflows and exits through the water dispensing hole 461. Then, the surplus low-concentration fertilizer solution reaches the recycling pipeline 24 of the water supply device 20. After that, the surplus low-concentration fertilizer solution flows into the filtration box 27 in the water storage container 21 through the water collection segments 242 and the horizontal segment 241 of the recycling pipeline 24. Therefore, the surplus low-concentration fertilizer solution is recycled and returned to the water storage container 21 of the water supply device 20.

The technical advantages of the usage and operation process of the water-circulation irrigation system 10 and its constituent elements over the prior art are explained below.

First, the user makes the water-circulation system ready for use by placing the fertilizer lumps 70 in the fertilizer chambers 61 of the shunting elements 60 of the planting devices 30, storing a sufficient amount of water in the water storage bucket 211 of the water storage container 21 of the water supply device 20, and electrically starting the water pumping motor 26 to draw water from the water storage bucket 211, so as to simultaneously produce the low-concentration fertilizer solution and perform fertilization and irrigation on the bottoms or roots of the crops and/or vegetables of the planting cans 56 received in the water collection spaces 40. Therefore, the water-circulation irrigation system is not only conducive to reduction in manpower cost but also enables production of the low-concentration fertilizer solution, fertilization and irrigation to be carried out simultaneously and conveniently.

Second, the water level sensor 25 is disposed in the water storage bucket 211 of the water supply device 20 and electrically controlled with the controller 12. The controller 12 electrically receives a water supply signal from the water level sensor 25 and thus electrically controls the water pumping motor 26 to automatically supply water from the water storage container 21 to the irrigation pipeline 22 at a predetermined point in time. Therefore, the water-circulation irrigation system is capable of automatically performing water-circulation irrigation or automatically supplying water to the water storage container 21 through the rectangular hole 215.

Third, the low-concentration fertilizer solution in the water collection spaces 44 of the water collection containers 40 is delivered via the recycling pipeline 24 of the water supply device 20 to the filtration box 27 in the water storage container 21 to undergo an impurity filtering process. Then, the filtered low-concentration fertilizer solution flows from the filtration box 27 to the water storage bucket 211 of the water storage container 21. Therefore, the water-circulation irrigation system greatly reduces the chance that impurities will be admitted to the water collection containers 40 of the planting devices 30 again and thus effectively extends the service life of the water-circulation irrigation system and its constituent elements.

Figure 12:
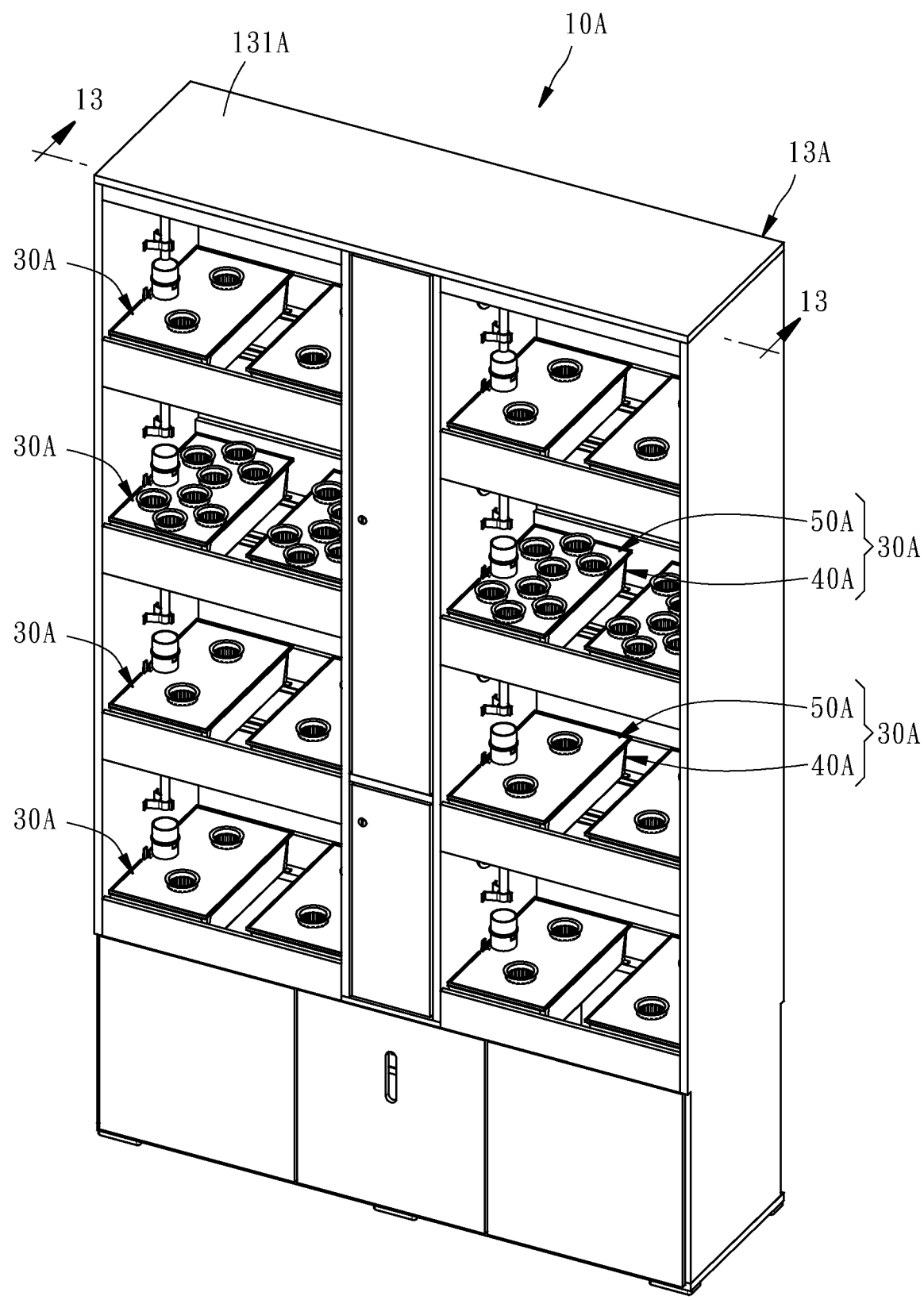
FIG. 12 is a perspective view of another water-circulation irrigation system and planting cans according to the second preferred embodiment of the present disclosure.
Figure 13:
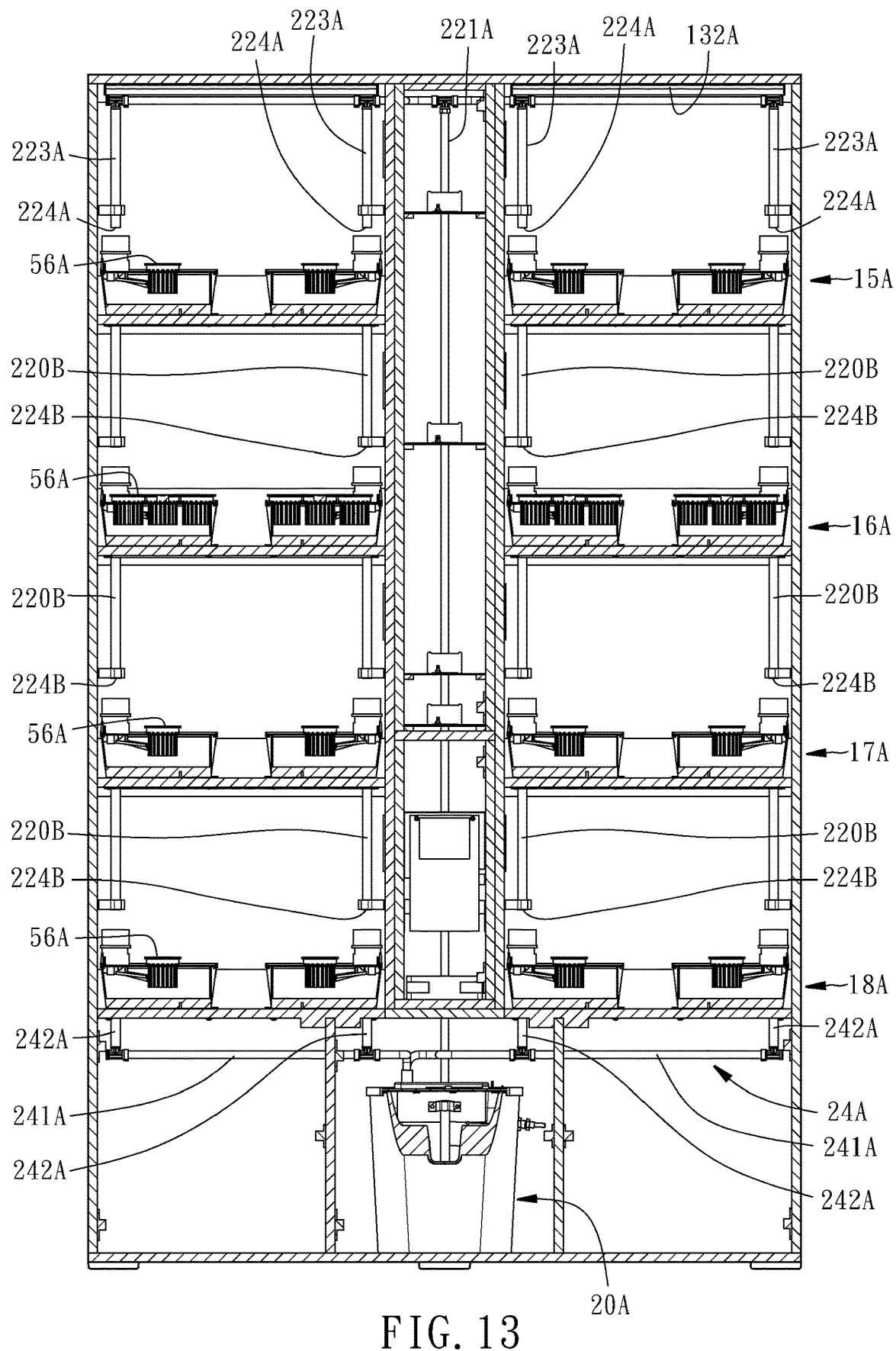
FIG. 13 is a cross-sectional view taken along line 13-13 of FIG. 12.
Figure 14:
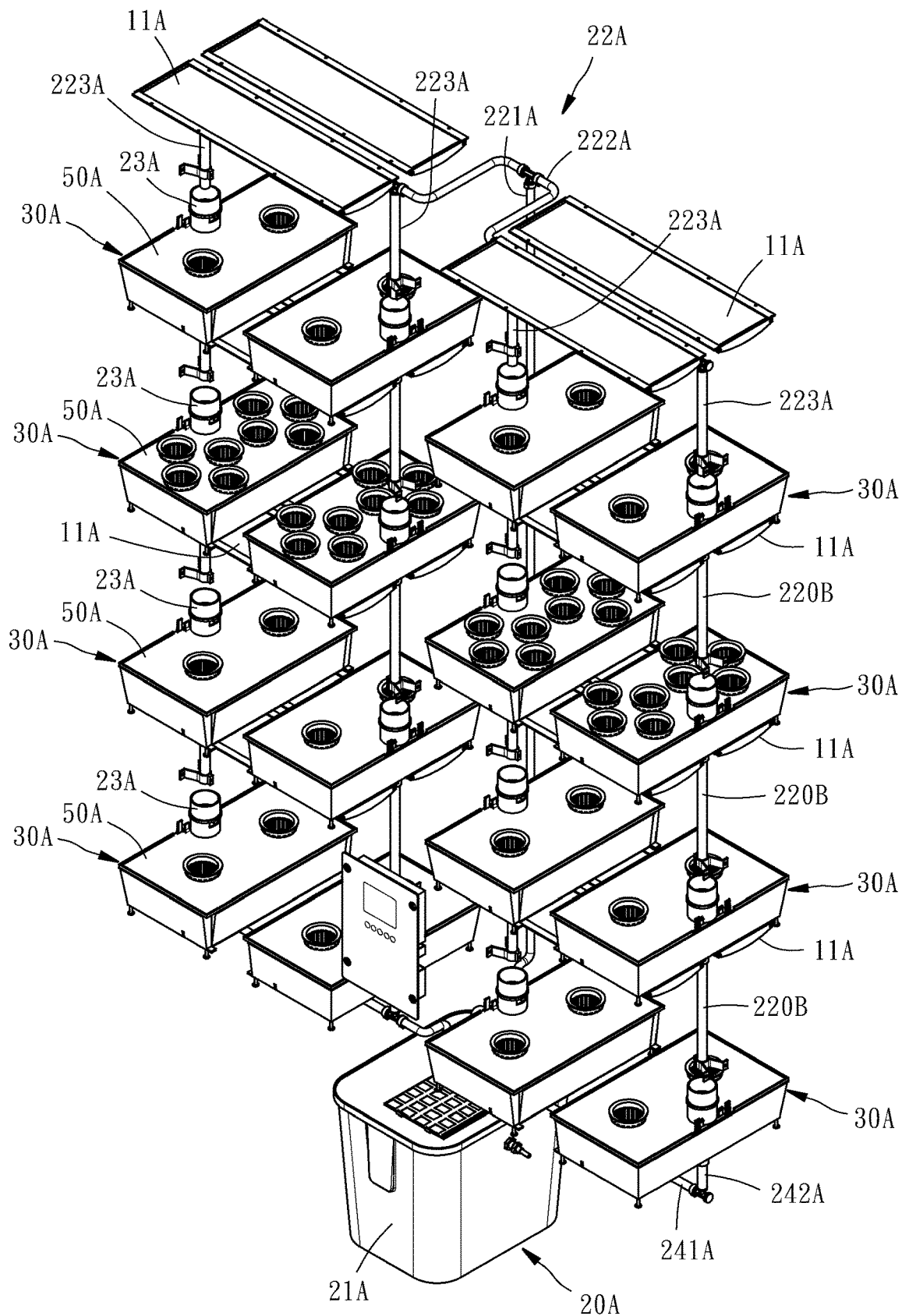
FIG. 14 is a perspective view similar to FIG. 12 but does not show a rack of the water-circulation irrigation system.

Referring to FIG. 12 through FIG. 14, unlike its counterpart in the first preferred embodiment of the present disclosure, another water-circulation irrigation system 10A in the second preferred embodiment of the present disclosure is of a multi-tier stacked structure to enhance the efficiency of fertilization and irrigation. The water-circulation irrigation system 10A comprises a rack 13A, a water supply device 20A provided in the first preferred embodiment, and 16 planting devices 30A provided in the first preferred embodiment. The distinguishing technical features of the water-circulation irrigation system 10A are described below.

First to fourth tiers 15A-18A are defined in the rack 13A sequentially from top to bottom. The planting devices 30A are fitted to the first to fourth tiers 15A-18A of the rack 13A through the water collection container 40A. The nozzles 23A of the water supply device 20A supply water to the shunting elements 60A of the 16 planting devices 30A, such that the fertilizer lumps 70 in the fertilizer chambers 61 of the shunting elements 60A are slowly rinsed by the water and thus dissolved therein so as to produce the low-concentration fertilizer solution. The water-circulation irrigation system 10A comprises illumination light sources 11A. The illumination light sources 11A are fitted to a lower surface 132A of a top panel 131A of the rack 13A and the outer surface of the water collection container 40A of the planting devices 30A on first to third tiers 15A-17A to emit light toward the crops and/or vegetables of the planting cans 56A in the planting trays 50A of the planting devices 30A.

The irrigation pipeline 22A of the water supply device 20A comprises a first pipe 220A and twelve second pipes 220B. The vertical segment 221A of the first pipe 220A is long and extends to a level higher than the planting devices 30A on the highest tier (i.e., the first tier) 15A of the rack 13A. A horizontal segment 222A of the first pipe 220A extends and thus is in communication with four water supply segments 223A, such that the water supply ends 224A of the water supply segments 223A correspond in position to the underlying nozzles 23A on the planting devices 30A. Ends of the second pipes 220B are in communication with the water dispensing holes of the water collection containers 40A of the planting devices 30A on the first to third tiers 15A-17A of the rack 13A, respectively, such that the other ends of the second pipes 220B each form a water supply end 224B. Therefore, the water supply segments 223A of the first pipe 220A and the second pipes 220B each have a water supply end 224A, 224B. The water supply ends 224A, 224B correspond in total number to the planting devices 30A.

The recycling pipeline 24A of the water supply device 20A comprises two horizontal segments 241A. The horizontal segments 241A are each in communication with the ends of the two water collection segments 242A, respectively, such that the other ends of the water collection segments 242A are in communication with the water dispensing holes of the water collection containers 40A of the planting devices 30A on the fourth tier 18A of the rack 13A, respectively.

Therefore, similarly, as soon as the level of the low-concentration fertilizer solution in the water collection containers 40A of the planting devices 30A on the first to third tiers 15A-17A of the rack 13A rises above the water dispensing holes in the water collection containers 40A, the surplus low-concentration fertilizer solution overflows and exits through the water supply ends 224B (of the second pipes 220B) in communication with the water dispensing holes of the water collection containers 40A, respectively, to serve as the mixture water source for the nozzles 23A on the planting devices 30A on second to fourth tiers 16A-18A of the rack 13A, so as to perform fertilization and irrigation on the crops and/or vegetables in the planting devices 30A on the second to fourth tiers 16A-18A of the rack 13A. Finally, as soon as the level of the low-concentration fertilizer solution in the water collection containers 40A of the planting devices 30A on the fourth tier 18A of the rack 13A rises above the water dispensing holes of the water collection containers 40A, the surplus low-concentration fertilizer solution overflows and flows to the water storage container 21A via the horizontal segments 241A and water collection segments 242A (of the recycling pipeline 24A of the water supply device 20A) in communication with the water dispensing holes of the water collection container 40A, so as to attain the technical advantages of the multi-tier stacked water-circulation irrigation system 10A in the second embodiment of the present disclosure.

The concentration of the fertilizer solution thus produced varies slightly from tier to tier. The cleanliness of water for rinsing the fertilizer lumps increases toward the highest tier, and thus the resultant fertilizer solution contains less impurity toward the highest tier. The fertilizer solution contains more fertilizer nutrients toward the lowest tier, because the fertilizer nutrients accumulate all the way down to the lowest tier. Therefore, the user chooses which tier to plant the crops and/or vegetables on according to their requirement for fertilization and irrigation, so as to effectively enhance the flexibility of diverse application of the multi-tier stacked water-circulation irrigation system 10A in the second embodiment of the present disclosure.

What is claimed is:

1. A water-circulation irrigation system, comprising:
a water supply device comprising a water storage container, an irrigation pipeline, a nozzle and a recycling pipeline, wherein the irrigation pipeline has an end being in communication with the water storage container and another end having a water supply end, and an end of the recycling pipeline is in communication with the water storage container; and
a planting device comprising a water collection container, a planting tray and a shunting element, the water collection container having a bottom portion, an external portion opposing the bottom portion, a sidewall and a water dispensing post, the sidewall surrounding the bottom portion in such a manner to form a water collection space and an opening being in communication with an outside, the water dispensing post being disposed in the water collection space to penetrate the bottom portion and the external portion and then extend away from the bottom portion and the external portion, the water dispensing post having therein a water dispensing hole exposed from top and bottom surfaces of the water dispensing post, the planting tray being disposed at the opening of the water collection container, the planting tray having a fitting portion, the fitting portion having therein a through hole and corresponding in position to the water collection space of the water collection container, the shunting element comprising a fertilizer chamber and being disposed at a rim of the through hole of the fitting portion of the planting tray,
wherein the nozzle of the water supply device is disposed between the water supply end of the irrigation pipeline and the fitting portion of the planting tray of the planting device, wherein the water dispensing hole of the water collection container of the planting device is in communication with another end of the recycling pipeline of the water supply device and thus in communication with the water storage container, wherein the shunting element of the planting device further comprises at least one shunting channel, and the fertilizer chamber of the shunting element has a receiving space, an upper opening in communication with the receiving space, at least one lateral opening in communication with the receiving space, and a plurality of support ribs disposed in the receiving space and spaced apart, wherein the at least one shunting channel has an end being in communication with the at least one lateral opening and another end having an outlet end, wherein the support ribs each have a concave arcuate surface facing the upper opening.

2. The water-circulation irrigation system of claim 1, further comprising illumination light sources and a controller, the illumination light sources emitting light toward the planting tray of the planting device, wherein the water supply device further comprises a water level sensor, a water pumping motor and a filtration box which are disposed in the water storage container, wherein the controller is connected electrically to and adapted to control the illumination light sources, the water level sensor and the water pumping motor.

3. The water-circulation irrigation system of claim 2, wherein the irrigation pipeline of the water supply device comprises a vertical segment, a horizontal segment and a water supply segment, wherein the vertical segment has an end being in communication with the water storage container and thus connected to the water pumping motor and another end being in communication with the horizontal segment, wherein an end of the horizontal segment is in communication with the water supply segment, such that an end of the water supply segment forms the water supply end.

4. The water-circulation irrigation system of claim 3, wherein the recycling pipeline of the water supply device comprises a horizontal segment and a water collection segment in communication with the horizontal segment of the recycling pipeline, the horizontal segment of the recycling pipeline having an end penetratingly disposed at the water storage container and being in communication with the filtration box, the water collection segment having an end being in communication with the water dispensing hole of the water collection container of the planting device.

5. The water-circulation irrigation system of claim 4, wherein the planting tray of the planting device has a top surface and a bottom surface opposing the top surface, the fitting portion extending upward from the top surface, wherein a free end of the fitting portion forms the through hole which extends toward the bottom surface, wherein the planting tray has at least one planting hole penetrating the planting tray and exposed from the top surface and the bottom surface.

6. The water-circulation irrigation system of claim 1, further comprising a plurality of planting devices, wherein the water supply device comprises a plurality of nozzles, the irrigation pipeline comprises a first pipe and at least one second pipe, and the recycling pipeline has at least one water collection segment, wherein the first pipe has an end in communication with the water storage container and has at least one water supply end, wherein an end of the at least one second pipe and the at least one water collection segment of the recycling pipeline are in communication with the water collection containers of the planting devices, respectively, wherein another end of the at least one second pipe has a water supply end, wherein the nozzles are disposed between the at least one water supply end of the first pipe and the fitting portions of the planting trays of the planting devices and between the water supply end of the at least one second pipe and the fitting portions of the planting trays of the planting devices, respectively;

wherein the water-circulation irrigation system further comprises a rack, and a plurality of tiers are defined in the rack sequentially from top to bottom, such that the planting devices are disposed on the tiers of the rack, respectively, wherein the fitting portions of the planting trays of the planting devices on the highest tier correspond in position to the at least one water supply end of the first pipe of the irrigation pipeline, wherein the fitting portions of the planting trays of the planting devices on the other tiers correspond in position to the water supply end of the second pipe in communication with the water collection containers of the planting devices on the immediately higher tiers, respectively, wherein the water collection segment of the recycling pipeline of the water supply device is in communication with the water collection containers of the planting devices on the lowest tier.

7. The water-circulation irrigation system of claim 1, wherein the at least one shunting channel of the shunting element of the planting device is formed by connecting a first guide panel and a second guide panel and tapers toward the outlet end.

8. The water-circulation irrigation system of claim 1, further comprising a plurality of planting devices, wherein the water supply device comprises a plurality of nozzles, the irrigation pipeline comprises a first pipe and at least one second pipe, and the recycling pipeline has at least one water collection segment, wherein the first pipe has an end in communication with the water storage container and has at least one water supply end, wherein an end of the at least one second pipe and the at least one water collection segment of the recycling pipeline are in communication with the water collection containers of the planting devices, respectively, wherein another end of the at least one second pipe has a water supply end, wherein the nozzles are disposed between the at least one water supply end of the first pipe and the fitting portions of the planting trays of the planting devices and between the water supply end of the at least one second pipe and the fitting portions of the planting trays of the planting devices, respectively.

\* \* \* \* \*